United States Patent [19]

Siemann et al.

[11] Patent Number: 4,750,594
[45] Date of Patent: Jun. 14, 1988

[54] SEAL FOR PNEUMATIC, HYDRAULIC OR HYDROPNEUMATIC UNITS

[75] Inventors: Martin Siemann, St. Sebastian; Manfred Zirbs, Boppard, both of Fed. Rep. of Germany

[73] Assignee: Stabilus GmbH, Koblenz-Neuendorf, Fed. Rep. of Germany

[21] Appl. No.: 891,219

[22] Filed: Jul. 28, 1986

[30] Foreign Application Priority Data

Aug. 16, 1985 [DE] Fed. Rep. of Germany ....... 3529422

[51] Int. Cl.$^4$ .............................. F16F 9/36; F16J 9/20
[52] U.S. Cl. .................. 188/322.17; 188/300; 267/64.11; 277/165; 277/214
[58] Field of Search ............. 188/300, 322.17; 267/64.11, 64.12, 113; 277/165, 214

[56] References Cited

U.S. PATENT DOCUMENTS

| | | | |
|---|---|---|---|
| 1,365,030 | 1/1921 | Flentje | 188/322.17 |
| 2,942,668 | 6/1960 | Maly et al. | 277/165 |
| 3,368,650 | 2/1968 | Wasdell | 188/322.17 X |
| 3,712,429 | 1/1973 | Otto | 188/300 |
| 4,336,946 | 6/1982 | Wheeler | 277/165 X |

FOREIGN PATENT DOCUMENTS

| | | |
|---|---|---|
| 1950381 | 4/1971 | Fed. Rep. of Germany . |
| 2905511 | 8/1980 | Fed. Rep. of Germany . |
| 2007955 | 1/1970 | France ........................ 188/300 |

OTHER PUBLICATIONS

Two (2) pages of "Busak & Luyken Dichtungen", catalog for seals.

Primary Examiner—Kenneth J. Dorner
Assistant Examiner—Peter R. Brown
Attorney, Agent, or Firm—Brumbaugh, Graves, Donohue & Raymond

[57] ABSTRACT

In a fluid-operated device such as a gas spring a piston rod is axially movably guided through a passage in an end wall of the gas spring. A sealing disc of elastomeric material is axially compressed between two supporting faces and engages the piston rod with a convex radially inner edge. The apex of the edge is substantially midway of the axial thickness of the sealing disc. Preferably the sealing disc has also a radially outwardly convex sealing edge which is in sealing engagement with a stationary face surrounding the sealing disc.

15 Claims, 3 Drawing Sheets

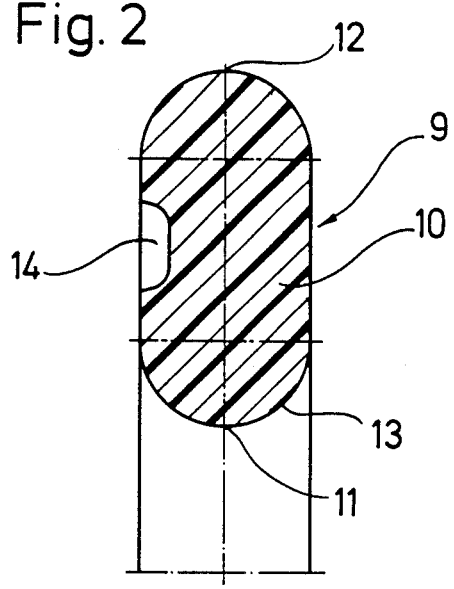
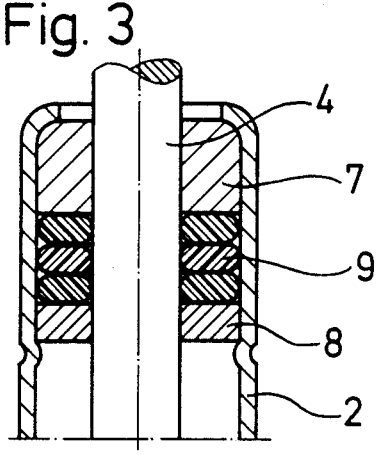
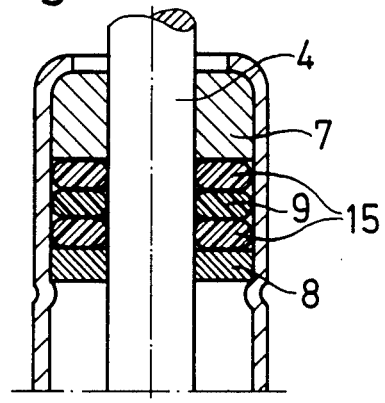

SEAL FOR PNEUMATIC, HYDRAULIC OR HYDROPNEUMATIC UNITS

BACKGROUND OF THE INVENTION

The invention relates to the sealing problem in pneumatic, hydraulic and hydropneumatic devices such as gas springs.

For the sealing of an axially movable component, for example a piston rod, it is known to use what are called O-rings. Ordinarily a reception groove is provided to receive the O-ring and the O-ring has a certain play in the axial direction in the reception groove. Accordingly the sealing line on the circumference of the O-ring also rolls on axial movement of the component to be sealed. Especially in those installation cases where the O-ring forms a dynamic seal on the inner diameter and a static seal on the external diameter, for example a dynamic piston rod seal and a static seal against the cylinder inner wall, a relatively great cord thickness of the O-ring is necessary, so that thus high friction and break-away forces are unavoidable in the dynamic seal. By reason of the rolling movement of the O-ring not only does the sealing line roll on the opposed sealing surface, but also a kind of pump effect occurs in which the medium to be sealed is conveyed to the exterior on reversal of direction of movement.

The known sealing rings formed with rectangular or X-shaped cross-sectional area, which abut with two sealing lips on the component to be sealed, also effect a tilting, for example in the axial movement of a piston rod to be sealed, in which the one sealing lip is relieved of load and the other sealing lip is pressed on more strongly. By reason of this tilting movement the danger exists that the medium under pressure may penetrate into the interspace defined by the sealing lips and thus is conveyed to the exterior on reversal of movement.

A sealing packing consisting of a plurality of sealing discs is known from Fed. German Publ. Sp. No. 1,950,381. Such a sealing packing forms a very large sealing area with the piston rod, since each sealing disc abuts on the piston rod over the entire axial thickness. Between the sealing discs support discs are provided which possess a radial play in relation to the dynamic sealing area, whereby the sealing discs are tiltable about the inner edges of the support discs and are pressable on the surface to be sealed with pressure-dependent clamping effect. Such a sealing arrangement possesses an undesirably high friction force between the seal and the movable component to be sealed, as a result of the large sealing area. Furthermore, the break-away forces—stick-slip effect—are very high, so that for example in gas springs or vibration dampers the outward thrust and damping forces are uncontrollably influenced.

It is the object of the present invention to provide a fluid-operated device with a seal which is simple and economical in construction and fitting and guarantees a satisfactory sealing effect without pumping effect with low friction and low break-away forces. This sealing disc should be usable either as a static or as a dynamic seal and, in case of need, be capable of bridging over larger radial distances between two sealing points.

SUMMARY OF THE INVENTION

A fluid-operated device according to this invention comprises at least one annular sealing disc which is located in a first sub-unit and is in sealing engagement with a sealing surface of a second sub-unit. The term "fluid-operated device" is to be understood in a broad sense. More particularly, this term is to cover devices which are dependent on outer fluid sources and such ones which are provided with a stationary filling of fluid. The sealing disc has an axis and is axially supported in both axial directions by support faces of the first sub-unit. The sealing disc has—when regarded in a plane of section containing its axis—a cross-sectional area elongate in radial direction before assembly. The cross-sectional area comprises a sealing edge engageable with the sealing surface of the second sub-unit. The sealing edge is convexly curved radially towards the sealing surface of the second sub-unit. The apex of the sealing edge is substantially midway of the axial thickness of the sealing disc.

Due to this sealing edge configuration the edge is very well supported by the sealing disc and therefore is not deflected even under high pressure differences. The deflection can be even more avoided by the support faces extending radially towards said sealing surface beyond the transition between the end faces and the convex sealing edge. A pumping effect is avoided. As a result of the sealing line having a small engagement face due to said convex configuration low friction and break-away forces are guaranteed. The seal itself is very simple in manufacture, assembly and fitting and usable either as a static or as a dynamic seal and furthermore permits of bridging over major radial distances between two seal points, for example a dynamic and a static seal point.

In accordance with a preferred embodiment of the invention a fluid-operated device comprises a separating unit which separates at least two spaces from each other. Passage means interconnecting the two spaces are defined by the separating unit. A cylindrical rod member having an axis is axially movably guided within the passage means. A sealing unit is allocated to the passage means. The sealing unit comprises at least one elastic annular sealing disc coaxially surrounding the rod member. The sealing disc is axially supported by substantially axially directed supporting faces adjacent both substantially axially directed end faces of the sealing disc. The sealing disc has—when regarded in a plane of section containing the axis—a cross-sectional area elongate in radial direction when regarded in the status before assembly. The cross-sectional area comprises a sealing edge adjacent the rod member. The sealing edge sealingly engages the rod member. The sealing edge is convexly curved radially towards the rod member. The apex of the sealing edge is substantially midway of the axial thickness of the sealing disc.

A very advantageous form of embodiment is obtained according to a further feature of the invention in that the sealing edge is formed by an approximately semi-circular contour. This permits both simple production and problem-free fitting and has the advantage that the sealing edge is optimally supported in relation to the disc basic body and thus an unambiguous position of the seal line is guaranteed even at very high pressures.

Since the friction force to be overcome in a dynamic seal formed by such a sealing disc is fairly precisely definable, in accordance with the invention by the arrangement of several sealing discs one behind another in the axial direction it is possible deliberately to build up a predetermined desired friction force betwen the mutually relatively moveable components, since the friction is added for each sealing disc.

A further advantageous form of embodiment is obtained tained according to a further feature in that on one or both sides of a middle sealing disc there are arranged elastic support discs which differ from the sealing discs only in lower pre-stress between the sealing edge and the opposed sealing surface. These support discs are effective as scraper discs or stripper means. By this simple combination of the sealing disc or sealing discs with one or several support discs the support discs keep soiling remote from the actual sealing area and thus produce a high operational reliability of the seal over a lengthy time period.

To produce easier radial mobility of adjacent sealing discs or support discs in relation to one another according to the invention each sealing disc or support disc is provided on at least one end face with a recess which serves to receive lubricant. In accordance with a further feature of this invention this recess is formed in a simple manner by at least one circular groove.

The formation of the sealing edge on both the internal diameter and the external diameter of the sealing disc renders it possible with one sealing disc only, according to the conditions of use, to provide either the dynamic seal on the internal diameter and the static seal on the external diameter or vice versa. Accordingly such sealing discs are suitable for use either as piston rod seal or as piston seal. Furthermore use as valve pin seal of a blocking valve of a blockable gas spring is readily possible. In the latter case it is especially advantageous that the sealing edge assumes a precisely defined position in every operational condition, so that the stroke movements of the blocking valve between open and closed can be kept very small, which is not possible in the case of a seal by means of an O-ring as a result of the rolling of this O-ring.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

BRIEF DESCRIPTION OF THE DRAWING

The invention will be explained in greater detail below by reference to the forms of embodiment illustrated in the drawing, wherein

FIG. 2 shows the sealing disc in enlarged representation;

FIG. 3 a piston rod seal formed by a plurality of sealing discs arranged axially one behind the other;

FIG. 4 shows a form of embodiment of a piston rod seal where the sealing disc is arranged between elastic support discs;

DETAILED DESCRIPTION OF THE PREFERRED EMBODIMENT

Figure 1:
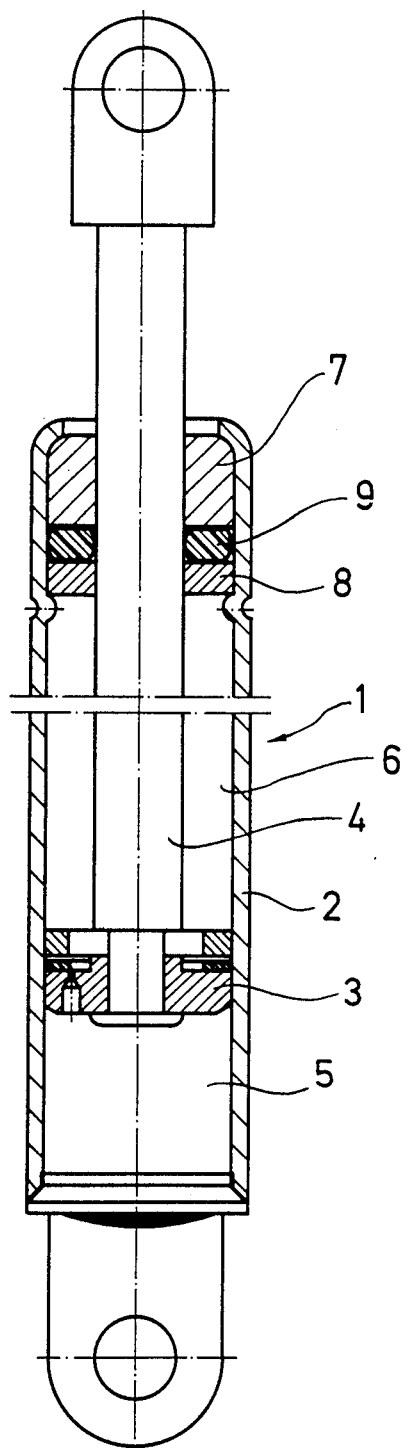
FIG. 1 shows a gas spring with a piston rod seal formed as sealing disc, in longitudinal section.

As example for pneumatic, hydraulic or hydropneumatic units, in FIG. 1 there is shown a gas spring 1 which comprises a cylinder 2 in which a piston rod 4 is guided by means of a piston rod guiding and sealing unit 7, 8, 9 comprising a sealing disc 9. In the interior of the cylinder 2 there is situated a fluid under high pressure comprising a gas and in addition to the gas optionally a liquid filling. The cavity 5, 6 within the cylinder 2 is divided by a piston 3, provided with passage openings and firmly connected with the piston rod 4, into the working chamber 5 beneath the piston and the working chamber 6 above the piston. The sealing disc 9 is here clamped in between an inner end face of the piston rod guide 7 and a rigid support disc 8.

The sealing disc 9 is represented in enlarged manner in FIG. 2. This disc 9 comprises a basic disc body 10 of elastomeric material with a radially inner sealing edge 11 and a radially outer sealing edge 12. In this sectional representation it is clear that both the inner sealing edge 11 and the outer sealing edge 12 are formed each by a semicircular contour 13 the radius of which corresponds to half the thickness of the basic sealing body 10. The apices of the sealing edges 11 and 12 are substantially midway of the axial thickness of the basic sealing body 10. A circular groove 14 is provided on on end face of the basic disc body 10 for the reception of a lubricant.

The form of embodiment according to FIG. 3 differs from that according to FIG. 1 essentially in that several sealing discs arranged axially one behind the other are arranged in the cylinder 2 for the sealing of the piston rod 4. These sealing discs 9 are here again clamped in on one side by the inner end face of the piston rod guide 7 and the rigid support disc 8. Such a form of embodiment is selected especially when a higher friction force is desired between the mutually relatively movable parts. Since the friction force of such a sealing disc 9 which is to be overcome is fairly precisely definable, by placing several such seal discs 9 one behind the other it is possible deliberately to build up the desired friction force, since the friction of the rings is cumulative.

Figure 5:
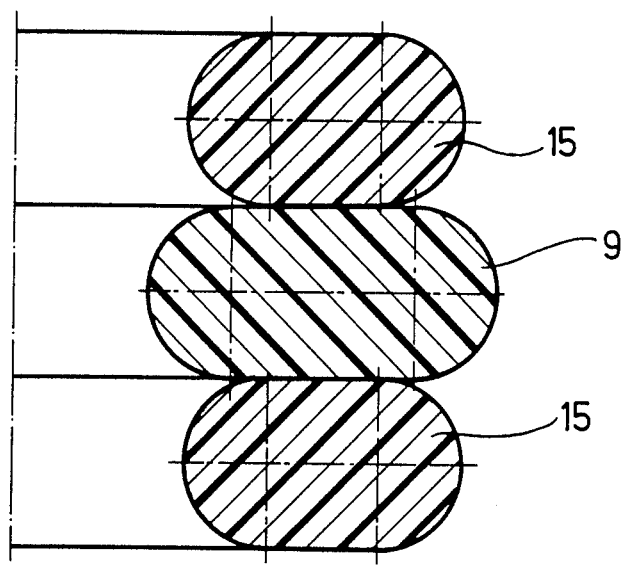
FIG. 5 shows the seal arrangement according to FIG. 4 in enlarged representation.

In FIGS. 4 and 5 there is shown a seal for the piston rod 4 which consists of a sealing disc 9 arranged between elastic support discs 15. This sealing unit likewise is clamped in between the inner end face of the piston rod guide 7 and the rigid support disc 8. As shown especially by FIG. 5, the sealing disc 9 differs from the elastic support discs 15 essentially by different radial length of the elongate cross-sectional area. The elastic support discs 15 here have predominantly the task of keeping dirt or abraded particles away from the sealing surface and accordingly act only as scrapes rings without substantial sealing function.

Figure 6:
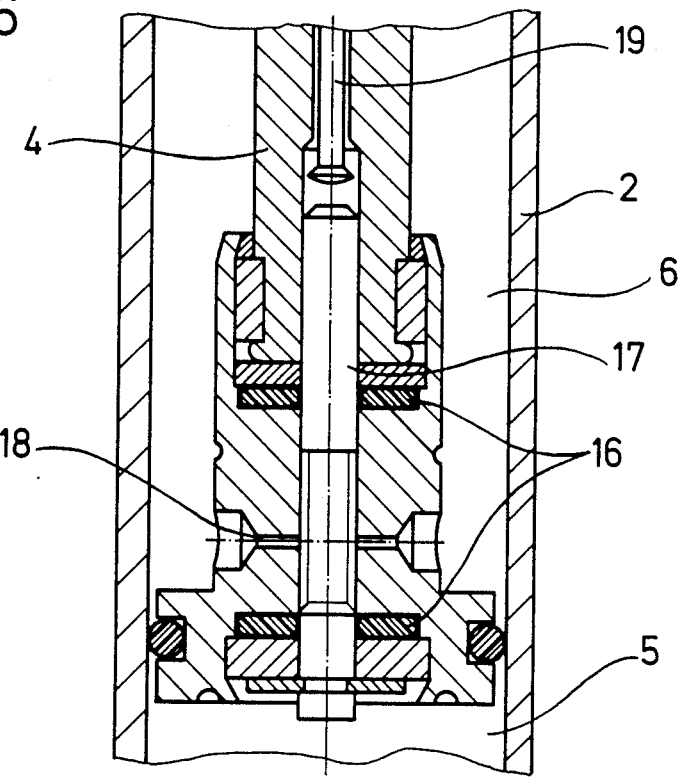
FIG. 6 shows the region of the piston of a steplessly blockable gas spring.

In FIG. 6 there is shown the piston of a steplessly blockable gas spring which is guided in sealing manner on the inner wall of the cylinder 2 and divides the interior of the cylinder 2 into the working chambers 5 and 6 which can be completely sealed from one another such as to stabilize the piston and the piston rod in a selected axial position in spite of the fluid pressure which biases the piston rod outwardly as long as the working chambers 5, 6 are interconnected. A blocking valve is provided for closing the interconnection between the working chambers 5 and 6. This blocking valve has a closing member 17, which closing member 17 is axially displaceable by means of the operating rod 19 guided to the exterior within the piston rod 4, and clears or blocks a flow-through means 18 between the working chambers 5 and 6. To seal the closing member 17 sealing discs 16 are provided which correspond in construction to the sealing discs 9 as described in FIGS. 1 to 5. The lower sealing disc 16 opens on downward movement of the closing member 17 when it lies over the section of reduced diameter. Due to the very precisely defined position of the sealing area between the lower clamped-in sealing disc 16 and the closing member 17, the axial movement of the closing member 17 can be reduced in comparison with an embodiment with O-ring seal, so that furthermore the opening of the valve always takes place in the same position of the operating rod 19.

It is easily understandable that a sealing disc according to this invention may also be provided between the operating rod 19 and the bore of the piston rod 4.

While specific embodiments of the invention have been shown and described in detail to illustrate the application of the inventive principles, it will be understood that the invention may be embodied otherwise without departing form such principles.

What is claimed is:

1. A fluid-operated device such as a pneumatic, hydraulic or hydropneumatic device comprising:

two sub-units having a common axis and being movable relative to one another thereon, a first one (2,7,8) of said sub-units accommodating at least one elastic annular sealing disc (9) coaxial with said axis and a second one (4) of said sub-units having a cylindrical surface coaxial with said axis and being sealingly engaged by a substantially radially directed sealing face of said sealing disc (9), said sealing disc (9) having axially directed end faces supported in opposite axial direction by respective axially directed support faces (7, 8) of said first sub-unit (2,7, 8) and two substantially radially directed boundary faces, a first of said boundary faces being said sealing face engaging said cylindrical surface, before assembly, said sealing disc (9) being of a cross-sectional area elongate in radial direction in a plane containing said axis and having two straight axially opposite boundary edges, one of said boundary edges being the generatrix of said sealing face, said one boundary edge (11) being convexly curved radially towards said cylindrical surface of said second sub-unit (4) and having its apex substantially midway of the axial thickness of said sealing disc (9), the second (12) of said boundary faces being in immediate supporting contact with a rigid substantially radially directed supporting face of said first sub-unit (2, 7, 8);

said sealing disc (9) being axially compressed by said axially directed support faces and being substantially non-movable in radial direction with respect to said axially directed support faces which compress said sealing disc over the total axially directed end faces thereof.

2. A fluid-operated device as set forth in claim 1, in which said first sub-unit (2, 7, 8) is provided with cyllindrical passage means and said second sub-unit comprises a cylindrical rod member (4) having an external cylindrical surface sealingly engaged by said sealing face (11) and which passes through said cylindrical passage means and is coaxially surrounded by said annular sealing disc (9).

3. A fluid-operated device as set forth in claim 2, wherein both of said axially directed support faces extend in radial direction towards said cylindrical surface beyond the respective axially directed end face and radially overlap said one convexly curved boundary edge.

4. a fluid-operated device as set forth in claim 2, wherein said cylindrical rod member (4) is a piston rod (4) guided through a piston rod guiding and sealing unit (7, 8, 9) at one end of a cylinder member (2) having a cylinder axis coincidental with said sub-unit axis, and said sealing disc (9) is a part of said piston rod guiding and sealing unit engageable with said piston rod (4) by its radially inward sealing face (11).

5. A fluid-operated device as set forth in claim 4, whereby said device is a fluid spring in which said cylinder member (2) defines a cavity (5, 6), at least partially filled with fluid under pressure, said sealing disc (9) sealing said cavity (5, 6) with respect to the atmosphere.

6. A fluid-operated device as set forth in claim 2, wherein
said device is a fluid spring having a cylinder member (2) defining a cavity with two working chambers (5, 6) between first and second ends thereof at least partially filled with a fluid under pressure, and being provided with a piston unit within said cavity (5, 6) sealing engaging an inner wall surface of said cylinder member (2), and wherein said cylindrical passage means extend through said piston unit, and said cylindrical rod member has an axially movable closing member in sealing engagement with said sealing disc for opening and closing said passage means in response to axial movement thereof.

7. A fluid-operated device as set forth in claim 2, wherein
said device is a fluid spring having a cylinder member (2) defining a cavity with two working chambers (5, 6) between first and second ends thereof, at least partially filled with a fluid under pressure and having flow-through means (18) cooperative with a closing member (17) for opening and closing thereof and for interconnecting said working chambers (5, 6), and a piston rod (4) extending through a piston rod guiding and sealing unit (7, 8, 9) adjacent one of sad ends of said cylinder member (2), said piston rod (4) being provided with a piston unit within said cavity (5, 6) sealingly engaging an inner wall surface of said cylinder member (2) and an internal axial bore along the axis thereof defining said passage means and having a closing member operating rod (19) axially movably housed therein for operating said closing member (I7) and wherein said operating rod (19) is said cylindrical rod member and said sealing disc engages said rod member so as to seal said fluid within said cavity (5, 6) against the atmosphere.

8. A fluid-operated device as set forth in claim 1, wherein said one boundary edge (11) has a semicircular contour the radius of which corresponds substantially to one half of the axial thickness of said sealing disc (9).

9. A fluid-operated device as set forth in claim 1, wherein a plurality of sealing discs (9) immediately contacting one another are axially disposed adjacent each other.

10. A fluid-operated device as set forth in claim 1, wherein stripper measn comprising an annular support disc (15) of elastic material is provided in immediate contact with at least one end face of said sealing disc (9), said stripped means having an elongate cross-sectional area with a boundary edge directed radially towards said cylindrical surface and of a smaller radial engagement pressure than said one boundary edge (11) of said sealing disc (9) and being convexly curved radially towards said cylindrical surface with its apex being substantially midway of the axially thickness of said support disc (15).

11. A fluid-operated device as set forth in claim 1, wherein said sealing disc (9) is provided in at least one of its substantially axially directed end faces with at least one recess (14) adapted for receiving a lubricant, said recess being completely covered by a further adjacent sealing disc or supporting disc, or by an axially directed support face.

12. A fluid-operated device as set forth in claim 11, wherein said recess (14) is shaped as a groove around said axis.

13. A fluid-operated device as set forth in claim 1, wherein the second (12) of said radially opposite boundary edges (11, 12) is convexly curved towards and in sealing engagement with said radially directed supporting face with its apex being substantially midway of the axial thickness of said sealing disc (9).

14. A fluid-operated device as set forth in claim 1 or 2, wherein said elongate cross-section has a radial length which is at least 1.5 times the axial thickness of said sealing disc.

15. A fluid-operated device as set forth in claim 14, wherein said radial length is at least twice the axial thickness of said sealing disc.

* * * * *

UNITED STATES PATENT AND TRADEMARK OFFICE
CERTIFICATE OF CORRECTION

PATENT NO. : 4,750,594

DATED : June 14, 1988

INVENTOR(S) : Siemann et al.

It is certified that error appears in the above-identified patent and that said Letters Patent is hereby corrected as shown below:

Col. 3, line 2, delete "tained" (second occurrence);
Col. 4, line 21, "on on" should read --on one--;
Col. 5, line 17, "form" should read --from--;
Col. 6, line 1, "a" should read --A--;
Col. 6, line 39, "sad" should read --said--;
Col. 6, line 60, "measn" should read --means--;
Col. 7, line 1, "axially" should read --axial--.

Signed and Sealed this

Twenty-seventh Day of December, 1988

Attest:

DONALD J. QUIGG

*Attesting Officer*  *Commissioner of Patents and Trademarks*